United States Patent
Nowlin et al.

(10) Patent No.: US 6,410,474 B1
(45) Date of Patent: *Jun. 25, 2002

(54) PROCESS FOR CONTROLLING THE MWD OF A BROAD/BIMODAL RESIN IN A SINGLE REACTOR

(75) Inventors: Thomas E. Nowlin, West Windsor; Sandra D. Schregenberger, Neshanic; Pradeep P. Shirodkar, Somerset; Grace O. Tsien, Colonia, all of NJ (US)

(73) Assignee: ExxonMobil Oil Corporation, Fairfax, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,526

(22) Filed: Mar. 10, 1997

Related U.S. Application Data (63) Continuation of application No. 08/303,269, filed on Sep. 8, 1994, now abandoned.

(51) Int. Cl.[7] .............................. B01J 31/00; B01J 37/00; C08F 4/02; C08F 4/60
(52) U.S. Cl. ................ 502/113; 502/103; 502/114; 502/115; 502/116; 502/117; 502/120; 502/132; 526/113; 526/114
(58) Field of Search ................ 502/103, 113, 502/114, 115, 116, 117, 120, 132; 526/114, 113

(56) References Cited

U.S. PATENT DOCUMENTS

| | | | |
|---|---|---|---|
| 3,798,202 A | 3/1974 | Nasser, Jr. | 260/88.2 |
| 4,210,559 A | 7/1980 | Melquist et al. | 252/431 R |
| 4,285,834 A * | 8/1981 | Lowery, Jr. et al. | 502/113 |
| 4,356,111 A | 10/1982 | Shipley et al. | 252/429 B |
| 4,383,939 A | 5/1983 | Johnstone | 252/429 B |
| 4,396,533 A | 8/1983 | Johnstone | 252/429 B |
| 4,518,751 A | 5/1985 | Mizogami et al. | 526/114 |
| 4,530,914 A | 7/1985 | Ewen et al. | 502/113 |
| 4,656,151 A | 4/1987 | Shelly et al. | 502/113 |
| 4,659,685 A | 4/1987 | Coleman, III et al. | 502/113 |
| 4,701,432 A | 10/1987 | Welborn, Jr. | 502/113 |
| 4,704,376 A | 11/1987 | Blenkers et al. | 502/104 |
| 4,739,022 A | 4/1988 | Blenkers et al. | 526/116 |
| 4,935,474 A | 6/1990 | Ewen et al. | 526/114 |
| 4,937,299 A | 6/1990 | Ewen et al. | 526/119 |
| 4,939,217 A | 7/1990 | Stricklen | 526/114 |
| 5,001,099 A | 3/1991 | Shelly | 502/113 |
| 5,013,701 A | 5/1991 | Coosmans et al. | 502/110 |
| 5,032,562 A | 7/1991 | Lo et al. | 502/111 |
| 5,064,797 A | 11/1991 | Stricklen | 502/111 |

(List continued on next page.)

FOREIGN PATENT DOCUMENTS

| | | | | |
|---|---|---|---|---|
| JP | A-2-189305 | * | 7/1990 | 526/114 |

*Primary Examiner*—Mark L. Bell
*Assistant Examiner*—J. Pasterczyk
(74) *Attorney, Agent, or Firm*—Stephen D. Prodnuk (57) ABSTRACT

A make-up catalyst of at least one metallic component of a bimetallic catalyst component is used in conjunction with a bimetallic catalyst to control the proportion of weight fractions in broad or bimodal molecular weight distribution olefin resin product. The bimetallic catalyst which is formed with at least one metallocene of a transition metal, produces broad or bimodal molecular weight distribution polyolefin resin whose composition depends on the ratio of the concentration of the two catalyst components producing the HMW/LMW components. The make-up catalyst consisting of a single metal component is added in proportion necessary to make-up the deficiencies in the amount of the HMW/LMW component. The type of make-up catalyst added depends on whether increase of the HMW or LMW component produced by the bimetallic catalyst is sought.

47 Claims, 1 Drawing Sheet

U.S. PATENT DOCUMENTS

| | | | |
|---|---|---|---|
| 5,077,255 A | 12/1991 | Welborn, Jr. | 502/104 |
| 5,120,696 A | 6/1992 | Tsutsui et al. | 502/113 |
| 5,124,418 A | 6/1992 | Welborn, Jr. | 526/114 |
| 5,145,818 A | 9/1992 | Tsutsui et al. | 502/113 |
| 5,155,079 A * | 10/1992 | Cribbs et al. | 502/113 |
| 5,155,187 A | 10/1992 | Shelly | 526/116 |
| 5,183,867 A | 2/1993 | Welborn, Jr. | 526/114 |
| 5,189,000 A | 2/1993 | Masi et al. | 502/113 |
| 5,198,400 A * | 3/1993 | Katzen et al. | 502/117 |
| 5,237,025 A * | 8/1993 | Benham et al. | 502/113 |
| 5,252,529 A | 10/1993 | Ueda et al. | 502/113 |
| 5,258,342 A * | 11/1993 | Luciani et al. | 502/107 |
| 5,266,544 A * | 11/1993 | Tsutsui et al. | 502/113 |
| 5,296,565 A * | 3/1994 | Ueda et al. | 526/114 |
| 5,308,816 A * | 5/1994 | Tsutsui et al. | 502/108 |
| 5,324,800 A * | 6/1994 | Welborn, Jr. et al. | 526/160 |
| 5,332,706 A * | 7/1994 | Nowlin et al. | 502/107 |
| 5,372,980 A * | 12/1994 | Davis | 502/103 |
| 5,395,810 A * | 3/1995 | Shamshoum et al. | 502/103 |
| 5,399,540 A * | 3/1995 | Kuo et al. | 502/113 |
| 5,408,015 A * | 4/1995 | Hsieh et al. | 502/113 |
| 5,463,001 A * | 10/1995 | Sano et al. | 502/115 |
| 5,470,811 A * | 11/1995 | Jejelowo et al. | 502/103 |
| 5,525,678 A | 6/1996 | Mink et al. | 525/246 |
| 5,589,549 A * | 12/1996 | Govoni et al. | 526/124.3 |
| 5,614,456 A * | 3/1997 | Mink et al. | 502/117 |
| 6,001,766 A * | 12/1999 | Kissin et al. | 502/103 |
| 6,051,525 A * | 4/2000 | Lo et al. | 526/114 |
| 6,096,841 A * | 8/2000 | Sacchetti et al. | 526/114 |
| 6,136,747 A * | 10/2000 | Kao et al. | 526/114 |
| 6,291,607 B1 * | 9/2001 | Sacchetti et al. | 526/114 |

* cited by examiner

PROCESS FOR CONTROLLING THE MWD OF A BROAD/BIMODAL RESIN IN A SINGLE REACTOR

This is a continuation of copending application Ser. No. 08/303,269, filed on Sep. 8, 1994 now abandoned.

BACKGROUND OF THE INVENTION

The invention relates to a dual-catalyst system for, and a catalytic preparation of, bimodal molecular weight distribution polymers and copolymers of ethylene, produced in one reactor. A make-up catalyst (catalyst one) and a bimetallic catalyst (catalyst two) are used to control the proportion of different weight fractions in broad or bimodal molecular weight distribution olefin resin product. The bimetallic catalyst produces broad or bimodal molecular weight distribution polyolefin resin, in which there are at least two components; one of the two components has a higher molecular weight (referred herein as HMW) than another of the two components, which is referred herein as LMW, low molecular weight (component). The bimetallic catalyst produces broad or bimodal molecular weight distribution polyolefin resin whose composition depends on the ratio of the concentration of the two metals of the catalyst producing the HMW/LMW components.

The make-up catalyst, consisting of a single metal component, is added in proportion necessary to make-up the deficiencies in the amount of the HMW/LMW component produced by the bimetallic catalyst. The type of make-up catalyst added depends on whether increase of the HMW or LMW component produced by the bimetallic catalyst is sought. A make-up catalyst of at least one metallic component of the bimetallic catalyst is used to control the weight fraction of the HMW component in the broad or bimodal molecular weight distribution olefin resin product.

In U.S. Pat. No. 5,032,562, a bimetallic catalyst system is described that produces broad or bimodal molecular weight distribution polyethylene resins in a single reactor. The LMW component is produced by the Zr site while the HMW component is produced by the Ti site.

The final product is essentially a gel-free intimate mixture of these two components because of the close proximity of the two metal sites.

In that product, the weight fraction of the HMW/LMW components in the final product is fixed by the relative concentration of the two metal species in the bimetallic catalyst. It is often desirable to change the weight fraction of either the HMW or LMW components produced by the bimetallic catalyst in the single reactor. Reformulation of the bimetallic catalyst offers one mode of operation, to change the relative weight fraction of one of the two components produced by such a catalyst. In accordance with the invention, time consuming reformulation procedure(s) are eliminated by employing a make-up stream of the pure component such that the desired composition of the HMW/LMW component is achieved. In the absence of the bimetallic catalyst [(i.e.) cofeeding one catalyst containing only the titanium (HMW) metal and a second catalyst containing only the zirconium (LMW) metal], the polymer will essentially be a physical mixture of the two components and severe restrictions will have to be placed on the allowable weight fraction of the two components for producing a gel free product with acceptable level of fines (less than 6 percent of the polymer) in the reactor.

SUMMARY OF THE INVENTION

The invention relates to a catalyst and a catalytic preparation of bimodal molecular weight distribution polymers and copolymers of ethylene, in one reactor. A make-up catalyst and a bimetallic catalyst are used simultaneously to control the proportion of different weight fractions in broad or bimodal molecular weight distribution polyolefin resin product. The invention relates to a catalyst system comprising (a) a bimetallic catalyst and (b) a make-up catalyst. The catalyst system comprises greater than 50—weight percent of the bimetallic catalyst. It is important to have the bimetallic catalyst as the primary catalyst supply to minimize gel formation. The bimetallic catalyst contains two transition metals or two different transition metal compounds, each having different hydrogen response characteristics. Because of the different hydrogen response of each of the two sources of transition metal in the bimetallic catalyst, each will produce a different molecular weight component under identical olefin polymerization conditions. In preferred embodiments below, the LMW component is produced by the Zr site while the HMW component is produced by the Ti site.

The bimetallic catalyst produces broad or bimodal molecular weight distribution polyolefin resin whose composition depends on the ratio of the concentration of the two transition metal catalyst components producing the HMW/LMW components. Thus the product of olefin polymerization in the presence of such a catalyst will comprise at least two fractions each of different molecular weight, and one having a relatively high molecular weight (hereinafter HMW) relative to a second fraction of relatively lower molecular weight (LMW).

In that product, the weight fraction of the HMW/LMW components in the final product is fixed by the relative concentration of the two metal species in the bimetallic catalyst. The make-up catalyst consists of a single metal component of the two components constituting the bimetallic catalyst; it is added in proportion necessary to increase either the amount of the HMW or the LMW component. The identity of the transition metal in the make-up catalyst added depends on whether increase of the HMW or of the LMW component produced by the bimetallic catalyst is sought. The make-up catalyst (b) is added, for example, as a make-up stream of the pure catalyst components such that the desired composition of the HMW/LMW components is achieved. In preferred embodiments below, a pure Ti catalyst can be co-fed if the HMW component weight fraction needs to be increased. In preferred embodiments below, a zirconium based (zirconocene) catalyst is co-fed to increase the LMW component weight fraction.

DETAILED DESCRIPTION OF THE INVENTION

For broad or bimodal molecular weight distribution polyethylene resins, the weight fraction of the HMW component should be in the range of 0.10 to 0.90. Another measurable property of the bimodal products is flow index, (FI, HLMI or $I_{21}$, measured at 190° C. in accordance with ASTM D-1238, Condition F.) The FI of the bimodal molecular weight distribution product is in the range of 2 to 100. MFR of products are preferably in the range of 30 to 250. MFR is defined herein as the ratio of the high load melt index (HLMI or $I_{21}$) divided by the melt index, i.e., $$MFR = \frac{I_{21}}{I_{2.16}}$$

Smaller MFR values indicate relatively narrow molecular weight distribution polymers.

The Bimetallic Catalyst-Component (A)

The major component (A) of the catalyst system comprises a carrier and two different sources of transition metal (zirconium, hafnium, titanium and vanadium), and may be referred to as a bimetallic catalyst. The major component is alone effective to polymerize ethylene, under ethylene polymerization conditions, to produce bimodal molecular weight distribution resin. This major component is more than 50 weight percent of the catalyst system of this invention. Because of the different hydrogen response of each of the two sources of transition metal in the bimetallic catalyst, each will produce a different molecular weight component under identical olefin polymerization conditions. In embodiments below, the metal of highest hydrogen response will be present in the catalyst in amounts of 0.2 to 0.6 weight percent preferably 0.3 to 0.5 of the bimetallic catalyst; in preferred embodiments below that metal is zirconium. The metal of lowest hydrogen response will be present in amounts in the catalyst of 0.5 to 3.0 preferably 0.8 to 2.0 weight percent; in preferred embodiments below that metal is titanium. This major component catalyst of the catalyst system of the invention is catalytically effective to produce bimodal molecular weight distribution product containing 0.35 to 0.75 weight percent of the high molecular weight component, HMW.

Catalyst Composition

Catalyst component A contains at least two transition metals. Preferably, one is in the form of a metallocene and one transition metal in the form of a non-metallocene, have an activity of at least about 1000 g polymer/g catalyst or about 50 kg polymer/g of each transition metal.

The catalyst component A requires a cocatalyst comprising an aluminum alkyl compound, such as a trialkyl aluminum, free of alumoxane and free of water, or oxygen-containing oligomers and polymers of the aluminum alkyl compound, and a catalyst precursor comprising a carrier, an alumoxane and at least one metallocene; in one embodiment the catalysts further include a non-metallocene transition metal source.

The carrier material is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram ($m^2/g$), and preferably at least about 50 $m^2/g$ up to about 350 $m^2/g$. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/g). The silica of the most preferred embodiment is a high surface area, amorphous silica (surface area=300 $m^2/g$; pore volume of about 1.65 $cm^3/g$), and it is a material marketed under the tradenames of Davison 952 or Davison 955 by the Davison Chemical Division of W. R. Grace and Company. The silica is in the form of spherical particles, e.g., as obtained by a spray-drying process. As procured, these silicas are not calcined; and this must be dehydrated, as indicated above.

The catalyst synthesis thereof is undertaken under inert conditions, in the absence of water and of oxygen. The carrier is dispersed in solvent to form a slurry.

The carrier material, having said (OH) groups, is slurried in a non-polar solvent and the resulting slurry is contacted with at least one organomagnesium compound having the empirical formula below. The slurry of the carrier material in the solvent is prepared by introducing the carrier into the solvent, preferably while stirring, and heating the mixture to about 25 to about 70° C., preferably to about 40 to about 60° C. Temperatures here are critical with respect to the non-metallocene transition metal which is subsequently added; that is temperatures in this slurry of about 90° C. or higher may result in deactivation of the transition metal added subsequently. Accordingly, all catalyst precursor synthesis steps are conducted below 90° C. The slurry is then contacted with the aforementioned organomagnesium compound, while the heating is continued as indicated.

The organomagnesium compound has the empirical formula $$R_m MgR'_n$$

where R and R' are the same or different $C_2$–$C_{12}$ alkyl groups, preferably $C_4$–$C_{10}$ alkyl groups, more preferably $C_4$–$C_8$ alkyl groups, and most preferably both R and R' are mostly butyl groups, and m and n are each 0, 1 or 2, providing that m+n is equal to the valence of Mg.

Suitable non-polar solvents are materials in which all of the reactants used herein, i.e., the organomagnesium compound, and the transition metal compound, are at least partially soluble and which are liquid under suitable reaction conditions. Preferred non-polar solvents are alkanes, such as isopentane, isohexane, n-hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of catalyst component A it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected as a solution in the solvent.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier.

It is also possible to add such an amount of the organomagesium compound which is in excess of that which will be deposited onto the support, and then remove, e.g., by filtration and washing, any excess of the organomagnesium compound. However, this alternative is less desirable than the most preferred embodiment described above.

The organomagnesium treated support is contacted with an organic alcohol reagent (ROH) containing RO— groups which are reactive or capable of displacing alkyl groups on the magnesium. The amount of this organic alcohol reagent is effective to provide a ROH:Mg ratio of 0.5 to 2.0, preferably 0.8 to 1.5.

Contact of the silica supported magnesium compound, with the organic alcohol reagent is undertaken in the slurry. Contact is undertaken at a temperature ranging from 25° C. to 80° C., preferably 40° C. to 60° C.

The alkyl group in the organic alcohol reagent can contain 2 to 12 carbon atoms, preferably 2 to 8; in the embodiments below, it is an alkyl containing 2 to 4 carbon atoms, particularly of 4 carbon atoms (butyl). The inclusion of the alcohol reagent step in the catalyst synthesis of the invention produces a catalyst which, relative to the absence of this step, is much more active, requires much less non-metallocen transition metal (e.g. titanium), and is much more active with respect to the final catalyst composition produced by the addition of the metallocene-transition metal component.

After the addition of the organic alcohol reagent to the slurry is completed, the slurry is contacted with a non-metallocene transition metal compound, free of substituted or unsubstituted cyclopentadienyl groups. The slurry temperature must be maintained at about 25 to about 70° C., preferably to about 40 to about 60° C. As noted above, temperatures in this slurry of about 90° C. or greater may result in deactivation of the non-metallocene transition metal. Suitable non-metallocene transition metal compounds used herein are compounds of metals of Groups 4, and 5, of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene form ranges from a Ti/Mg molar ratio of 0.3 to 1.0, preferably from 0.50 to 0.80.

Mixtures of such non-metallocene transition metal compounds may also be used and generally no restrictions are imposed on the transition metal compounds which may be included. Any transition metal compound that may be used alone may also be used in conjunction with other transition metal compounds.

After the addition of the non-metallocene transition metal compound is complete, the slurry solvent is removed by evaporation or filtering to obtain a free-flowing powder. Next, incorporation of a metallocene can be undertaken. The metallocene is activated with an alumoxane.

Metallocene compound(s) has the formula $Cp_xMA_yB_z$ in which Cp is an unsubstituted or substituted cyclopentadienyl group, M is zirconium or hafnium or titanium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group: and x is at least 1. The substituents on the cyclopentadienyl group can be preferably straight-chain $C_1-C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen, —Si($CH_3$)$_2$—, Si($CH_3$)$_2$—$CH_2$—$CH_2$—Si($CH_3$)$_2$— and similar bridge groups. If the A and B substituents in the above formula of the metallocene compound are halogen atoms, they belong to the group of fluorine, chlorine, bromine or iodine; and y+z is 3 or less, provided that x+y+z equals the valence of M. If the substituents A and B in the above formula of the metallocene compound are alkyl groups, they are preferably straight-chain or branched $C_1-C_8$ alkyl groups, such as methyl, ethyl, n-propyl, isopropyl, n-butyl, isobutyl, n-pentyl, n-hexyl or n-octyl.

Suitable metallocene compounds include bis (cyclopentadienyl)metal dihalides, bis(cyclopentadienyl) metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1-C_6$ alkyls. Illustrative, but non-limiting examples of metallocenes include bis (cyclopentadienyl)zirconium dichloride, bis (cyclopentadienyl)hafnium dichloride, bis (cyclopentadienyl)zirconium dimethyl, bis (cyclopentadienyl)hafnium dimethyl, bis(cyclopentadienyl) zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis (dimethylcyclopentadienyl) zirconium dichloride, bis (pentamethylcyclopentadienyl)zirconium dichloride, bis (pentamethylcyclopentadienyl)hafnium dichloride, cyclopentadienyl-zirconium trichloride, bis(indenyl) zirconium dichloride, bis(4,5,6,7-tetrahydro-1-indenyl) zirconium dichloride, and ethylene-[bis(4,5,6,7-tetrahydro-1-indenyl)]zirconium dichloride. The metallocene compounds utilized within the embodiment of this art can be used as crystalline solids, as solutions in aromatic hydrocarbons or in a supported form.

The alumoxane can be impregnated into the carrier at any stage of the process of catalyst preparation. In this embodiment, the amount of Al, provided by alumoxane, is sufficient to provide an Al:transition metal (provided by metallocene) mole ratio ranging from 50 to 500, preferably 75 to 300.

The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a C$_1$–C$_8$ alkyl group and preferably methyl, methyl alumoxane (MAO). MAO is a mixture of oligomers with a very wide distribution of molecular weights and usually with an average molecular weight of about 1200. MAO is typically kept in solution in toluene.

Incorporation of the activated metallocene component onto the carrier can be accomplished in various ways. Incorporation of either or both the alumoxane and metallocene compound can be into the slurry resulting from the addition, i.e. after the addition, of the non-metallocene transition metal.

Alternatively, and in accordance with the unique method of infusion of alumoxane into the pores of the carrier, the carrier slurry can be stripped of solvent, after the addition of the non-metallocene transition metal compound, to form a free-flowing powder. The free flowing powder can then be impregnated by determining the pore volume of the carrier and providing an alumoxane (or metallocene-alumoxane) solution in a volume equal to or less than the total pore volume of the carrier, and recovering a dry catalyst precursor. The resulting free-flowing powder, referred to herein as a catalyst precursor, is combined with an activator (sometimes referred as a cocatalyst).

The volume of the solution comprising a solid alumoxane and a solvent therefore can vary. In a preferred embodiment, of alumoxane incorporation into the carrier, one of the controlling factors in the alumoxane incorporation into the carrier material is the pore volume of the silica. In this preferred embodiment, the process of impregnating the carrier material is by infusion of the alumoxane solution, without forming a slurry of the carrier material, such as silica, in the alumoxane solution. The volume of the solution of the alumoxane is sufficient to fill. the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica is formed. Accordingly, if the pore volume of the carrier material is 1.65 cm$^3$/g, then the volume of alumoxane will be equal to or less than 1.65 cm$^3$/gram of carrier material. As a result of this proviso, the impregnated carrier material will appear dry immediatedly following impregnation although the pores of the carrier will be filled with inter alia solvent.

Solvent may be removed from the alumoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° C. and below about 50° C. to obviate agglomeration of catalyst particles and crosslinking of the alumoxane. Although solvent can be removed by evaporation at relatively higher temperatures than that defined by the range above 40° C. and below about 50° C., very short heating times must be employed to obviate agglomeration of catalyst particles and crosslinking of the alumoxane.

In a preferred embodiment, the metallocene is added to the solution of the alumoxane prior to impregnating the carrier with the solution. Again, as noted above, the maximum volume of the alumoxane solution also including the metallocene is the total pore volume of the carrier material sample. The mole ratio of alumoxane provided aluminum, expressed as Al, to metallocene metal expressed as M (e.g. Zr), ranges from 50 to 500, preferably 75 to 300, and most preferably 90 to 200. An added advantage of the present invention is that this Al:Zr ratio can be directly controlled. In a preferred embodiment the alumoxane and metallocene compound are mixed together at a temperature of about 20 to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

The catalyst component formed from the organomagnesium compound, the non-metallocene transition metal and the activated metallocene, is activated with a cocatalyst, which is an alkyl aluminum compound, free of water and free of oxygen-containing oligomers.

The cocatalyst can be a trialkylaluminum, free of an alumoxane. Preferably, trimethylaluminum (TMA) is the cocatalyst or activator. The amount of the TMA activator is sufficient to give an Al:Ti molar ratio of about 10:1 to about 1000:1, preferably about 15:1 to about 300:1, and most preferably about 20:1 to about 100:1.

Moreover, in accordance with the invention, the cocatalyst or activator is fed to e.g., a fluid bed reactor for polymerizations and copolymerizations of ethylene in the absence of alumoxane solution.

The Make-Up Catalyst Component (B)

The make-up component of the catalyst system of the invention comprises one of those two different sources of transition metal, which are contained in the major component of the catalyst system; it is effective to increase the amount of one of the two molecular weight components, HMW or LMW; and to alter the overall polymer FI and MFR. In embodiments below, it is effective to increase FI and MFR. The make-up component of the catalyst system comprises only. 1.0 to 50%, preferably 1.5% to 30% of the catalyst system. It produces a monomodal molecular weight polymer component. The make-up catalyst will provide monomodal polymer component in amount comprising 1 to 30 weight percent of the ultimate resin product.

Catalyst Composition

The make-up catalyst of the invention comprises a carrier, an alumoxane and at least one metallocene. It is free-flowing and particulate in form comprising dry powder particles having a particle size of from about 1 micron to about 250 microns, preferably from about 10 microns to about 150 microns. The catalyst which contains only one transition metal in the form of a metallocene has an activity of at least about 200 kg polymer/g of transition metals. The alumoxane and metallocene loading on the carrier is such that the amount of aluminum, (elemental basis) provided by the alumoxane, on the carrier ranges from 1 to 40 weight percent, preferably from 5 to 30 weight percent, and most preferably from 5 to 15 weight percent. The optimum MAO loading (Al) is in the range of 3 to 15 mmoles (Al) per gram of silica carrier; if a silica carrier is overloaded with MAO, the catalyst activity is lower and the catalyst particles agglomerate with attendant problems of transferring the catalyst.

In the make-up catalyst the amount of metallocene on the carrier ranges, on a transition metal elemental basis, from 0.001 to 10 weight percent, preferably from 0.05 to 0.5, and most preferably from 0.10 to 0.3 weight percent. Accordingly the ratio of Al:Zr (on an elemental basis) in the catalyst can range from 25 to 10,000, usually within the range of from 70 to 980 but preferably from about 70 to 350 or 100 to 350, and most preferably from 100 to 200.

The carrier material is a solid, particulate, porous, preferably inorganic material, such as an oxide of silicon and/or of aluminum. In the most preferred embodiment, the carrier is silica in the form of spherical particles, e.g., as obtained by a spray-drying process. The carrier material is used in the form of a dry powder having a particle size of from about 1 micron to about 500 microns, preferably from about 1 micron to about 250 microns, and most preferably about 10 microns to about 150 microns. The final catalyst containing carrier material may be sieved to insure elimination of large catalyst particles. Presently, elimination of catalyst particles that have a particle size of greater than 500 microns is envisaged. Preferably, elimination of particles of greater than 250 micron particle size, and, most preferably, elimination of particles of greater than 150 micron particle size is undertaken. Sieving of the material is preferably undertaken after impregnation of the carrier with the metallocene and the alumoxane. This is highly desirable when this catalyst component contains only one transition metal in the form of a metallocene and is used to form narrow molecular weight distribution polymer, to reduce and/or to eliminate gels in the final polyolefin product and to eliminate reactor hot spots, thereby to insure reactor continuity, particularly in the gas phase fluid bed process.

The surface area of the carrier is at least about 3 square meters per gram ($m^2/g$), preferably, 5 to 500 square meters per gram ($m^2/g$) and most preferably at least about 50 $m^2/g$ up to about 350 $m^2/g$. The pore volume of the carrier will range from 0.1 to 5 cc/g, preferably from 0.1 to 3.5 cc/g. The carrier material should be dry, that is, free of absorbed water.

Preferably, the carrier is silica, which contains [OH] groups. The carrier material must have at least some active hydroxyl (OH) groups to produce the catalyst composition of this invention. The hydroxyl group concentration will be at least about 0.7 mmole/gram silica. Preferably, the hydroxyl group concentration of the silica will range from 1.6 to 2.5 mmoles/gram silica. This range is favored by lower drying, dehydration and/or calcination temperatures.

The silica hydroxyl (herein silanol, silica hydroxyl is used interchangeably) groups are detectable by IR spectroscopy. Quantitative determinations of the hydroxyl concentration on silica are made by contacting a silica sample with methylmagnesium iodide and measuring methane evolution (by pressure determination).

Dehydration of silica material can be effected by heating at about 100° C. to about 600° C., preferably from about 150° C. to about 300° C. and most preferably at about 250° C.

By comparison, silica dehydrated at 600° C. (for about 16 hours) will have a surface hydroxyl concentration of about 0.7 mmoles per gram (mmols/gm) of silica. Silica dehydrated at 800° C. will be a silica with 0.5 mmole of silica hydroxy groups per gram silica. The silica of the most preferred embodiment is a high surface area, amorphous silica (surface area=300 $m^2$/gm; pore volume of 1.65 $cm^3$/gm), and it is a material marketed under the tradenames of Davison 952 or Davison 955 by the Davison Chemical Division of W. R. Grace and Company. As purchased, the silicas are not dehydrated and must be dehydrated prior to use.

The amount of hydroxyl groups, in mmoles/gram silica can be affected by the dehydration temperatures used to condition the silica. The dehydration temperatures of about 250° C. increase the amount of reactive hydroxyl groups available for contact with the solution of alumoxane and metallocene, relative to the silica heat treated, for dehydration purposes, to 600° C. Thus it has been found that the catalyst made with the silica subjected to dehydration temperatures of 250° C. is more active than a catalyst produced with the silica subjected to drying temperatures of 600° C. Accordingly, preferred dehydration and/or calcination temperatures are below 400° C., more preferably below 300° C., and most preferably at about 250° C. Accordingly, the silica used in embodiments of the invention will contain a silanol (OH) concentration of greater than 0.7 mmoles OH per gram silica; preferably it will contain greater than 0.7 mmoles up to 2.5 mmoles OH per gram of silica. In preferred embodiments, the concentration ranges from 1.6 to 1.9 mmoles/gram silica.

To form catalysts of the invention, all catalyst components can be dissolved with alumoxane and impregnated into the carrier. Catalyst preparation is undertaken under anhydrous conditions and in the absence of oxygen. In a unique process, the carrier material is impregnated with alumoxane, preferably methylalumoxane (MAO), in a process described below. The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a $C_1$–$C_8$ alkyl group and preferably methyl. MAO is a mixture of oligomers with a very wide distribution of molecular weights and usually with an average molecular weight of about 1200. MAO is typically kept in solution in toluene.

The volume of the solution comprising an alumoxane and a solvent therefor can vary, depending on the catalyst sought to be produced. In a preferred embodiment of alumoxane incorporation into the carrier, one of the controlling factors in the alumoxane incorporation into the carrier material is the pore volume of the silica. In this preferred embodiment, the process of impregnating the carrier material is by infusion of the alumoxane solution, without forming a slurry of the carrier material, such as silica, in the alumoxane solution. This is undertaken with agitation. The volume of the solution of the alumoxane is sufficient to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica in solvent is formed in this step. By way of example, if the pore volume of the carrier material is 1.65 cc/gm, then the volume of alumoxane will be equal to or less than 1.65 cc/gm of carrier material. Thus, the maximum volume of solution (of metallocene and alumoxane) will equal the total pore volume of the carrier, e.g. silica, which is the pore volume in, e.g., cc/gm, times the total weight of the carrier used. As a result of this provision, the impregnated carrier material will appear dry immediatedly following impregnation, although the pores of the carrier may be filled with inter alia solvent. However, it has been noted that the solution volume can be up to 30% greater than the total pore volume of the silica with the result(s) that no slurry of the silica is formed and that the silica remains mostly dry in appearance. The preferred solvent for the alumoxane, e.g. methylalumoxane, is toluene.

Solvent may be removed from the alumoxane impregnated pores of the carrier material by heating and/or under a vacuum or purged with heating in an inert gas, such as nitrogen. If elevated temperature is employed, the temperature conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° and below about 50° to obviate agglomeration of catalyst particles and crosslinking of the alumoxane. Preferably drying is undertaken at 45° C. or less for 5 to 7 hours. Although solvent can be removed by evaporation at relatively higher temperatures than that defined by the range above 40° and below about 50° C., very short heating times must be employed to obviate agglomeration of catalyst particles and crosslinking of the alumoxane, with reduction of catalyst activity. Accordingly, an active catalyst has been produced at evaporation temperature of 110° C. (at extremely short heating times), whereas at 45° C., drying can be undertaken for periods of 24 hours.

In a preferred embodiment, the metallocene is added to the solution of the alumoxane prior to impregnating the carrier with the solution. Again the maximum volume of the alumoxane solution also containing the metallocene is the total pore volume of the carrier material sample. The molar ratio of aluminum provided by alumoxane, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at ambient temperature for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters; preferably it is toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight- or branched chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and and R" are short alkyl groups or hydrogen, —$Si(CH_3)_2$—, $Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis (cyclopentadienyl)metal dihalides, bis(cyclopentadienyl) metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis (cyclopentadienyl)zirconium dichloride, bis (cyclopentadienyl)hafnium dichloride, bis (cyclopentadienyl)zirconium dimethyl, bis (cyclopentadienyl)hafnium dimethyl, bis(cyclopentadienyl) zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, Bis (dimethylcyclopentadienyl)zirconium dichloride, bis (pentamethylcyclopentadienyl)zirconium dichloride, bis (pentamethylcyclopentadienyl)hafnium dichloride, cyclopentadienyl-zirconium trichloride, bis(indenyl) zirconium dichloride, bis(4,5,6,7-tetrahydro-1-indenyl) zirconium dichloride, and ethylene-[bis(4,5,6,7-tetrahydro-1-indenyl)]zirconium dichloride. The metallocene compounds utilized within the embodiment of this art can be used as crystalline solids, as solutions in aromatic hydrocarbons or in a supported form.

The Process Conditions

Alpha-olefins are polymerized with the catalyst system of the present invention by any suitable process. Such processes include polymerizations carried out in suspension, in solution or in the gas phase. Gas phase polymerization reactions are preferred, e.g., those taking place in stirred bed reactors and, especially, fluidized bed reactors. The polymerization is carried out at relatively low temperatures, e.g., from about 30 to about 105° C. Preferably. polymerization pressures are less than 10,000 psi, preferably less than 1000 psi, and most preferably in the range of 100 to 350 psi.

A particularly desirable method for producing polyethylene polymers according to the present invention is in a fluid bed reactor. Such a reactor and means for operating it are described by Nowlin et al, U.S. Pat. No. 4,481,301, the entire contents of all of which are incorporated herein by reference. The polymer produced in such a reactor contains the catalyst particles because the catalyst is not separated from the polymer. The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30 to about 105° C. This control of molecular weight may be evidenced by measurable positive change in melt index ($I_2$) of the polymer produced.

When a fluid bed reactor is employed, the catalyst system of the invention can be introduced, separately, via two catalyst feeders or a mixture thereof can be fed to the reactor.

Products

The polyolefin resin products of the invention can be low density products of densities of less than 0.94 g/cc. Preferably, the products are high density products with densities of greater than about 0.94. The products are broad or bimodal molecular weight distribution products which contain 0.10 to 0.90, preferably 0.30 to 0.70 most preferably 0.50 to 0.65 weight percent of the high molecular weight component.

The film products exhibit excellent Dart Drop Impact (DDI) as measured by ASTM D 1709. The products exhibit Dart Drop Impact (DDI) in the range of 150 to 800 g, preferably from 300 to 800 g and most preferably from 400 to 800 g for a nominal 1 mil gauge film.

The resins resulting from the process of the invention exhibit FI of 2 to 100, depending upon product application. The FI is a measure of a resin's viscosity which relates to its processability. Increase in resin FI means lower viscosity which improves processability. However, there is generally a trade-off with properties. Typically, as FI increases, properties deteriorate. For most product applications, there is an optimum FI for maximized processability and properties, which also depends upon MWD.

Ethylene polymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-1-pentene copolymers.

EXAMPLES

Catalysts

Catalyst Example 1

(A) Titanium Catalyst Component Preparation. 541 grams of Davison grade 955-(600° C. calcination temperature) silica was weighed into a two-gallon stainless steel autoclave containing a stirring paddle. Next, ca. 4.8 liters of dry isopentane was added to the autoclave and the stirring rate was set at 100 rpm. The temperature of the silica/isopentane slurry was 54–58° C. Next, 546 mls of dibutylmagnesium (0.713 mmol/ml) was added to the slurry. The contents of the autoclave were stirred for 60 minutes. Then, 42.8 mls of neat 1-butanol were added and stirring was continued for one hour. Finally, 21.4 mls of titanium tetrachloride was added to the autoclave and stirring continued for 60 minutes. After this time, all solvents were removed by evaporation under a nitrogen purge. Catalyst yield was 496 grams of a white free-flowing powder. Ti found 1.45 wt. %; Mg found 1.41 wt. %.

Catalyst Example 2

Preparation of Bimetallic Catalyst Solution B: 15.97 grams of $(BuCp)_2ZrCl_2$ was transferred to a one-liter bottle and 846 ml of a 4.67 Molar (13.7 wt. % Al) solution of methylalumoxane were added. The bottle was shaken for about one minute to a yellow solution which was transferred into a 1.5 liter stainless steel hoke bomb and used immediately as described below.

Under an inert atmosphere, 465 grams of the titanium-containing catalyst described above in Example 1 was added to a 2-gallon, glass-reactor vessel containing a helical stirrer to agitate the catalyst powder and a temperature jacket which was set at about 30° C. The stirrer was set at 125 rpm. Then, the contents of the hoke bomb (solution B) was added to the titanium-containing catalyst in approximately 5–10 ml aliquots every 30–60 seconds over a 45 minute period. The total volume of solution (B) used was such that the titanium containing catalyst always appeared "dry" during the entire addition time. However, during this addition time, the white titanium-containing catalyst turned a dark brown color. After the addition of solution (B) was complete, the jacket temperature was set at 45° C. and the residual toluene was removed with a nitrogen purge for 5 hrs. After this time the catalyst was a dark brown free-flowing powder. Analytical results: Mg, 0.86 wt. %; Ti, 0.91 wt. %; Al, 13.0 wt. % and Zr, 0.45 wt. %.

Example 3

Make-Up Catalyst Preparation: 493 g of silica (Davison 955), dehydrated at 250° C., was reacted with a solution of 6.986 g of (n-butyl $Cp)_2ZrCl_2$ dissolved in 670 grams of MAO in toluene as described in Example 2. The MAO solution contained 13.7 wt. % Al. The Al/Zr ratio was 200:1. The catalyst was dried under flowing $N_2$ at 45° C. for 5 hours, and was sieved to remove any particles larger than 150 microns. The catalyst contained 9.2 wt. % Al and 0.17 wt. % Zr.

Example 4

This example illustrates the effect of cofeeding a bimetallic catalyst product in Example 2 with and without a cofeed of the catalyst produced in Example 3. The polymerization was conducted in the fluid bed reactor under the following conditions: reactor temperature of 95° C., ethylene partial pressure of 190–195 psig, $H_2/C_2$ ratio of 0.009–0.011, $C_6/C_2$= =0.013, and, TMA level of 240–245 ppm. The results of Example 4 are summarized in Table I.

Figure 1:
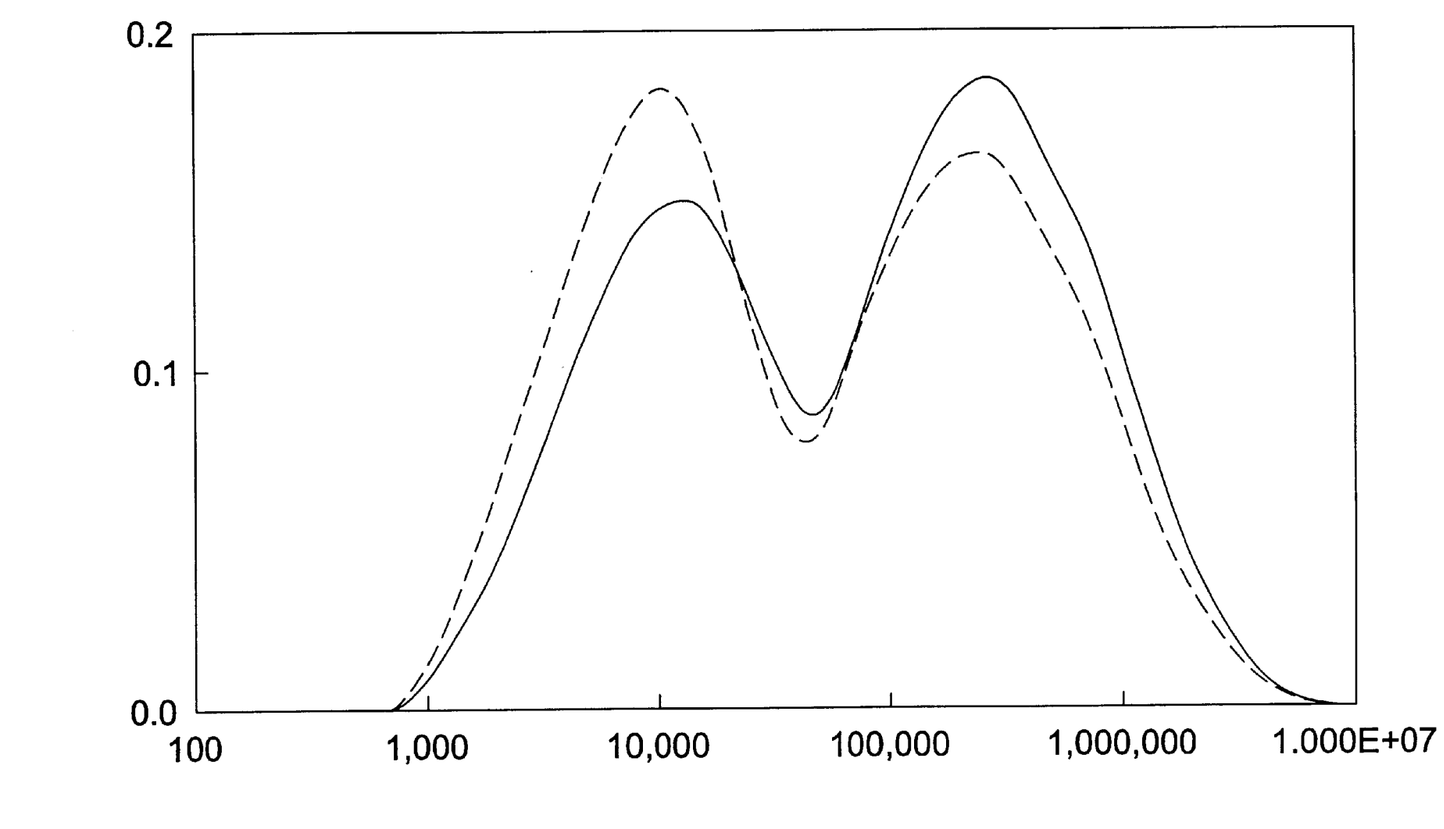
The FIGURE is a gel permeation chromatogram of polyethylene produced with sample which is a plot of weight fraction vs. molecular weight; the unbroken line is a graph of a bimodal molecular weight polymer produced with a bimetallic catalyst in the absence of a make-up catalyst of the invention. The broken line is a graph of the bimodal molecular weight distribution product produced with the bimetallic catalyst plus a make-up catalyst.

The increase in FI and MFR in Resin B of Table I is a direct result of the increase in the weight fraction of the LMW component produced by cofeeding both the catalysts of Examples 2 and 3. The attached GPC figure also shows this increase. In addition, the resultant increase in the LMW weight fraction is accomplished without creating excessive fines (<6%) in the reactor.

TABLE I

Results of Example 4

| | Catalyst Feed | | | | | |
|---|---|---|---|---|---|---|
| Resin | Example 2 | Example 3 | Density | FI | MFR | % Fines |
| A | 100% | 0% | .947 | 10.0 | 85 | .7 |
| B | 78% | 22% | .950 | 26.4 | 121 | 4.2 |

Example 5

This example illustrates the effect of cofeeding a bimetallic catalyst product in Example 2 with and without a cofeed of the catalyst produced in Example 3. The polymerization conditions were similar to Example 4, except for the presence of isopentane. The fluid bed reactor conditions are as follows: reactor temperature of 95° C., ethylene partial pressure of 190–195 psig, $H_2/C_2$ ratio of 0.009–0.011, $C6^=/C2^==0.013$, isopentane/$C2^==0.16$, and TMA level of 150–200 ppm. The results of Example 5 are summarized in Table II.

The increase in FI and MFR in Resin C of Table II is a direct result of the increase in the weight fraction of the LMW component produced by cofeeding both the catalysts of Examples 2 and 3. Comparing the catalyst feed rates of the catalyst of Example 3 for Resin D (Table II) and Resin B (Table I) shows that the activity of the catalyst is higher in the presence of isopentane. In addition, the resin fines level is lower in the presence of isopentane.

TABLE II

Results of Example 5

| | Catalyst Feed | | | | | |
|---|---|---|---|---|---|---|
| Resin | Example 2 | Example 3 | Density | FI | MFR | % Fines |
| C | 100% | 0% | .947 | 8 | 80 | 0.5 |
| D | 95% | 5% | .950 | 19.2 | 113 | 1.2 |

What is claimed is:

1. A mixed catalyst composition comprising I) and II), wherein the mixed catalyst composition comprises greater than 50 weight percent of I), wherein
   I) comprises a supported catalyst of at least two different transition metal compositions, each composition providing under identical olefin polymerization conditions, a different polymerization.product to provide a resin comprising two different molecular weight distribution fractions, wherein one of said at least two different transition metal compositions is a metallocene compound of a metal selected from the group consisting of zirconium, hafnium and titanium, and wherein
   II) comprises a support matrix and, supported thereon, one of said at least two different transition metal compositions, which is effective to increase one fraction of said two different molecular weight distribution fractions.

2. The mixed catalyst of claim 1, wherein I) comprises an aluminum alkyl non-oxygen containing cocatalyst and a dry, anhydrous, support-containing composition comprising an activated metallocene compound of a transition metal and a non-metallocene transition metal compound,
   wherein said aluminum alkyl cocatalyst activates said non-metallocene transition metal compound;
   wherein the support is the contact product of (1) silica having OH groups, impregnated with $R_mMgR_n$, wherein each of $R_m$ and $R_n$ is alkyl of 4 to 10 carbon atoms,
   wherein $R_mMgR_n$ is present in an amount to provide a $R_mMgR_n$:OH molar ratio of 0.5:1 to 4:1; and (2) an organic alcohol reagent providing alkoxy groups having a formula R'O—, wherein R' is an alkyl of 1 to 12 carbons;
   wherein said reagent is used in an amount effective to provide an alcohol/Mg molar ratio of 0.5 to 2.0.

3. The mixed catalyst of claim 2, wherein each of $R_m$ and $R_n$ is alkyl of 4 to 8 carbon atoms.

4. The mixed catalyst of claim 2, wherein each of $R_m$ and $R_n$ is butyl.

5. The mixed catalyst of claim 2, wherein each of $R_m$ and $R_n$ contains 4 carbon atoms.

6. A process for polymerizing olefins of two to 10 carbon atoms comprising feeding olefin(s) of 2 to 10 carbon atoms to a reactor, under olefin polymerization conditions, contacting the feed with a catalyst A) which comprises
   a supported catalyst of two different sources of transition metal, wherein one of said two different sources of transition metal provides, under said polymerization conditions, a polymerization product of relatively high molecular weight, and wherein a second of said two different sources of transition metal provides, under said polymerization conditions, a polymerization product of lower molecular weight relative to said product of relatively high molecular weight, to provide a resin having two different molecular weight distribution fractions, wherein one of said two different sources of transition metal comprises a metallocene compound of a metal selected from the group consisting of zirconium, hafnium and titanium;
   cofeeding catalyst A) in the presence of catalyst B) comprising a support matrix and, supported thereon, one of said two different sources of transition metal which is effective to increase one fraction of said two different molecular weight distribution fractions, and
   recovering the resin from the reactor.

7. The mixed catalyst of claim 2, wherein R'O— is provided as an alcohol.

8. The mixed catalyst of claim 2, wherein the contact product is formed by:
   (i) providing a slurry of a non-polar solvent and a solid porous silica having —OH groups;
   (ii) impregnating said silica with $R_mMgR_n$ to form an intermediate (ii), wherein the Mg:—OH group ratio is less than 2, wherein said $R_mMgR_n$ is soluble in said non-polar solvent; and
   (iii) treating the intermediate (ii) with an amount of R'OH to form a step (iii) product.

9. The mixed catalyst of claim 8, wherein the non-metallocene transition metal composition comprises titanium.

10. The mixed catalyst of claim 9, wherein the non-metallocene transition metal composition comprises titanium tetrachloride.

11. The mixed catalyst of claim 10, wherein the process forming the contact product further comprises, after (iii),
   (iv) treating the step (iii) product with $TiCl_4$ to form a titanium-containing intermediate; and
   (v) combining the titanium-containing intermediate with said cocatalyst.

12. The mixed catalyst of claim 11, wherein the cocatalyst is trimethylaluminum.

13. The mixed catalyst of claim 1, wherein the metallocene transition metal compound is provided as a compound which has the formula $Cp_xMA_yB_z$, wherein Cp is cyclopentadienyl unsubstituted or substituted by alkyl of 1 to 6 carbon atoms; x is at least 1; each of A and B is halogen or alkyl of 1 to 8 carbon atoms, and y plus z is 3 or less provided that x+y+z is equal to the valence of M, which is selected from the group consisting of titanium, zirconium, and hafnium.

14. The mixed catalyst of claim 2, wherein the metallocene transition metal compound is provided as a compound which has the formula $Cp_xMA_yB_z$, wherein Cp is cyclopentadienyl unsubstituted or substituted by alkyl or alkylene of 1 to 6 carbon atoms; x is at least 1; each of A and B is halogen or alkyl of 1 to 8 carbon atoms, and y plus z is 3 or less provided that x+y+z is equal to the valence of M, which is selected from the group consisting of titanium, zirconium and hafnium.

15. The mixed catalyst of claim 14, wherein the metallocene compound is selected from the group consisting of bis(cyclopentadienyl)zirconium dichloride and bis(n-butylcyclopentadienyl) zirconium dichloride.

16. The mixed catalyst of claim 14, wherein the metallocene compound is activated with a solution of methylalumoxane; wherein the supported catalyst comprises silica which has a pore volume in the range of 1.0 cm$^3$/g to 4.0 cm$^3$/g; and wherein the solution has a volume which is equal to the total pore volume.

17. The mixed catalyst of claim 1, wherein II) is in the form of particles having a particle size in the range of 1 to 500 μm;
wherein said particles comprise silica, a transition metal and aluminum, wherein the mole ratio of aluminum to transition metal ranges from about 70:1 to 350:1;
wherein said silica is amorphous and porous and has a pore volume of 0.1 to 3.5 cm$^3$/g; wherein said silica has a concentration of silanol groups of at least 0.7 mmol per gram of silica;
wherein a solution of a mixture comprising bis(n-butylcyclopentadienyl)zirconium dichloride and alumoxane provides said transition metal and said aluminum; wherein said solution has a maximum volume equal to the total pore volume of said silica, and wherein said solution is employed to impregnate said silica.

18. The mixed catalyst of claim 17, wherein said alumoxane has a formula (a) or (b) wherein (a) is R—(Al(R)—O)$_n$—AlR$_2$ for oligomeric, linear alumoxanes and (b) is (—Al(R)—O—)$_m$ for oligomeric cyclic alumoxane wherein n is 1–40, m is 3–40, and R comprises a C$_1$–C$_8$ alkyl group.

19. The mixed catalyst of claim 17, wherein the alumoxane is methylalumoxane (MAO).

20. The mixed catalyst of claim 18, wherein said mixture provides an Al:Zr mole ratio of 100:1 to 350:1.

21. The mixed catalyst of claim 20, wherein the Al:Zr mole ratio is 100:1 to 200:1.

22. The mixed catalyst of claim 18, wherein the particles are characterized by a particle size ranging from 1 to 250 μm.

23. The mixed catalyst of claim 17, wherein the concentration of silanol groups is greater than 0.7 but less than 2.5 mmol per gram of silica.

24. The mixed catalyst of claim 17, wherein the concentration of silanol groups is from about 1.7 to less than 1.9 mmol per gram of silica.

25. The mixed catalyst of claim 17, wherein said mixture provides an Al:Zr ratio,(elemental basis) of 100:1 to 200:1.

26. The mixed catalyst of claim 2, wherein II) is in the form of particles having a particle size in the range of 1 to 500 μm;
wherein said particles comprise silica, a transition metal and aluminum wherein the mole ratio of aluminum to transition metal ranges from about 70:1 to 350:1;
wherein said silica is amorphous and porous and has a pore volume of 0.1 to 3.5 cm$^3$/g; wherein said silica has a concentration of silanol groups of at least 0.7 mmol per gram of silica;
wherein a solution of a mixture of bis(tetrahydroindenyl) zirconium dichloride and alumoxane provides said transition metal and said aluminum;
wherein said solution has a maximum volume equal to the total pore volume of said silica, and wherein said solution is employed to impregnate said silica.

27. The mixed catalyst of claim 26, wherein said alumoxane has a formula (a) or (b)
wherein (a) is R—(Al(R)—O)$_n$—AlR$_2$ for oligomeric, linear alumoxanes and (b) is (—Al(R)—O—)$_m$ for oligomeric cyclic alumoxane wherein n is 1–40, m is 3–40, and R comprises a C$_1$–C$_8$ alkyl group.

28. The mixed catalyst of claim 26, wherein the alumoxane is methylalumoxane (MAO).

29. The mixed catalyst of claim 27, wherein said mixture provides an Al:Zr mole ratio of 100:1 to 350:1.

30. The mixed catalyst of claim 29, wherein the Al:Zr mole ratio is 100:1 to 200:1.

31. The mixed catalyst of claim 27, wherein the particles are characterized by a particle size ranging from 1 to 250 μm.

32. The mixed catalyst of claim 26, wherein the concentration of silanol groups is greater than 0.7 but less than 2.5 mmol per gram of silica.

33. The mixed catalyst of claim 26, wherein the concentration of silanol groups is from about 1.7 to less than 1.9 mmol per gram of silica.

34. The mixed catalyst of claim 26, wherein said mixture provides an Al:Zr ratio (elemental basis) of 100:1 to 200:1.

35. The mixed catalyst of claim 1, wherein I) comprises an aluminum alkyl non-oxygen containing cocatalyst and a dry, anhydrous support-containing composition comprising an activated metallocene compound of a transition metal and a non-metallocene transition metal compound,
wherein said aluminum alkyl cocatalyst activates said non-metallocene transition metal compound.

36. The mixed catalyst of claim 35, wherein II) is in the form of particles having a particle size in the range of 1 to 500 μm,
wherein said particles comprise silica, a transition metal metallocene and aluminum, wherein the mole ratio of aluminum to transition metal ranges from about 70:1 to 350:1.

37. The mixed catalyst of claim 1, wherein II) is in the form of particles having a particle size in the range of 1 to 50 μm;
wherein said particles comprise silica, a transition metal and aluminum, wherein the mole ratio of aluminum to transition metal ranges from about 70:1 to 350:1;
wherein said silica is amorphous and porous and has a pore volume of 0.1 to 3.5 cm$^3$/g; wherein said silica has a concentration of silanol groups of at least 0.7 mmol per gram of silica; and
wherein a metallocene is a source of said transition metal and alumoxane is a source of said aluminum.

38. The mixed catalyst of claim 37, wherein the alumoxane is methylalumoxane (MAO).

39. The mixed catalyst of claim 38, wherein II) comprises Zr and has an Al:Zr mole ratio of 100:1 to 200:1.

40. The mixed catalyst of claim 39, wherein the metallocene is bis(n-butylcyclopentadienyl)zirconium dichloride.

41. The mixed catalyst of claim 38, wherein the metallocene is bis(tetrahydroindenyl)zirconium dichloride.

42. The mixed catalyst of claim 2, wherein II) is in the form of particles having a particle size in the range of 1 to 500 μm;
wherein said particles comprise silica, a transition metal and aluminum, wherein the mole ratio of aluminum to transition metal ranges from about 70:1 to 350:1;

wherein said silica is amorphous and porous and has a pore volume of 0.1 to 3.5 cm$^3$/g; wherein said silica has a concentration of silanol groups of at least 0.7 mmol per gram of silica; and wherein metallocene is a source of said transition metal and alumoxane is a source of said aluminum.

43. The mixed catalyst of claim 42, wherein the alumoxane is methylalumoxane (MAO).

44. The mixed catalyst of claim 42, wherein II) comprises Zr and has an Al:Zr mole ratio of 100:1 to 200:1.

45. The mixed catalyst of claim 42, wherein the metallocene is bis(n-butylcyclopentadienyl)zirconium dichloride.

46. The mixed catalyst of claim 42, wherein the metallocene bis(tetrahydroindenyl)zirconium dichloride.

47. The mixed catalyst of claim 36, wherein the support of I) comprises silica having OH groups impregnated with $R_mMgR_n$, wherein each of $R_m$ and $R_n$ is alkyl of 4 to 10 carbon atoms;

wherein $R_mMgR_n$ is present in an amount to provide an $R_mMgR_n$:OH molar ratio of 0.5:1 to 4:1 and said $R_mMgR_n$ impregnated silica is contacted with an organic alcohol reagent providing alkoxy groups having a formula R'O—, where R' is an alkyl of 1 to 12 carbons; and wherein said reagent is used in an amount effective to provide an alcohol/Mg molar ratio of 0.5:1 to 2.0:1.

* * * * *